United States Patent [19]

Bakermans

[11] Patent Number: 4,936,496

[45] Date of Patent: Jun. 26, 1990

[54] SPROCKET-TYPE STRIP FEED MECHANISM

[75] Inventor: Johannes C. W. Bakermans, Harrisburg, Pa.

[73] Assignee: AMP Incorporated, Harrisburg, Pa.

[21] Appl. No.: 57,556

[22] Filed: Jun. 3, 1987

Related U.S. Application Data

[63] Continuation-in-part of Ser. No. 32,149, Mar. 27, 1987, Pat. No. 4,753,145.

[51] Int. Cl.[5] .......... F16H 21/22; G03B 1/24

[52] U.S. Cl. .......... 226/83; 74/44; 226/154; 226/156

[58] Field of Search .......... 226/76, 74, 83, 82, 226/86, 152, 156, 142, 154; 74/42, 44

[56] References Cited

U.S. PATENT DOCUMENTS

| | | | |
|---|---|---|---|
| 1,153,723 | 9/1915 | Stedman | 74/45 |
| 2,549,271 | 4/1951 | Wienke | 226/83 |
| 2,608,406 | 8/1952 | Del Valle | 226/83 |
| 2,912,814 | 11/1959 | Witt et al. | 56/296 |
| 3,116,000 | 12/1963 | Wales, Jr. | 226/76 |
| 3,174,347 | 3/1965 | Hecht | 74/38 |
| 4,018,153 | 4/1977 | Freeman | 226/86 X |

*Primary Examiner*—Joseph J. Hail, III

*Attorney, Agent, or Firm*—Frederick W. Raring; James M. Trygg

[57] ABSTRACT

Strip feed mechanism comprises an intermittently rotated sprocket wheel which engages the strip material. A guide plate extends tangentially past the sprocket wheel and serves to hold the strip material against the wheel and in engagement with the sprocket teeth. At the end of a feeding interval, the guide plate is moved away from the sprocket wheel by a bell crank mechanism. The bell crank mechanism comprises a bell crank having a movable axis which, in combination with other features of the mechanism, permits the guide plate to be moved away abruptly from the sprocket so that the feeding interval is brought to an abrupt halt without "chattering" or other slight uncontrolled movement of the strip.

19 Claims, 8 Drawing Sheets

SPROCKET-TYPE STRIP FEED MECHANISM

RELATED APPLICATIONS

This application is a Continuation-in-Part of application Ser. No. 032,149, filed Mar. 27, 1987 now U.S. Pat. No. 4,753,145.

FIELD OF THE INVENTION

This invention relates to strip feed mechanisms of the type having an intermittently rotated feed sprocket for feeding the material. The invention is particularly directed to a feed mechanism which can be precisely controlled and which is disengaged from the material being fed at the instant of termination of the feeding interval. The invention is also related to bell crank mechanisms which can be used in a variety of circumstances.

BACKGROUND OF THE INVENTION

It is common practice to intermittently feed strip material by means of a sprocket which has teeth which engage spaced-apart index holes in the strip. The sprocket is intermittently rotated by a stepping motor or the like so that the strip is fed during periods of rotation of the sprocket and the strip is not fed when the motor is not energized. It is necessary, in feeding devices of this type, to provide a guide member extending tangentially with respect to the sprocket to hold the strip material in engagement with the sprocket.

In feeding devices of the type described above, and for that matter, in most known feeding devices such as hitch feeds, it is difficult to avoid a slight amount of chattering or other strip movement at the end of the feeding interval and the strip is, moreover, firmly constricted or held by the sprocket after it comes to rest. This characteristic is undesirable in many stamping and forming machines for the reason that the stamping and forming die assembly usually has pilot pins which enter the index holes in the strip at a location adjacent to the feeding device and precisely position that portion of the strip which extends through the stamping die. If the strip is tightly held against longitudinal movement by the feeding device, and if the pilot holes in the vicinity of the die are not precisely aligned with the pilot pins, the portion of the strip extending through the die might be damaged when the punches and dies subsequently engage the strip. This can be particularly damaging if the strip has previously been partially formed or if the blanks have been punched from the strip. The pilot holes will fail to precisely align the partially formed strip material with the punches and dies and damage to the partially formed parts or to the blanks in the strip will result. It would be desirable to release the strip at the instant of the end of the feeding interval from the feeding device so that the pilot holes could center the strip in the die by causing it to move a very slight amount as they enter the index holes in the strip. The distances being considered here are, of course, very slight, of the order of 0.001 inches, but a misalignment of even this slight amount can result in the production of inferior parts which may not satisfy the tolerance specifications for the parts being manufactured.

The present invention is directed to the achievement of an improved sprocket type feeding mechanism which can be precisely controlled as is required for high-speed stamping and forming operations and which, at the conclusion of each feeding interval, releases the strip material so that it can be moved in the direction of its length by a very slight amount when the pilot pins in an adjacent die enter the index holes of the strip. The invention is also directed to the achievement of an improved bell crank type mechanism which is used in the practice of the present invention and which can be used for other purposes.

THE INVENTION

The invention comprises a strip feeding means of the type having an intermittently rotatable feed wheel which is engaged with the strip during feeding intervals and which is disengaged from the strip during non-feeding intervals. The invention is characterized in that a strip guide is provided for guiding the strip to the feed wheel, the strip guide being movable between an engaged position and a disengaged position. The strip guide is effective to hold the strip in engagement with the feed wheel when it is in its engaged position and the strip is unrestrained with respect to the feed wheel when the strip guide is in its disengaged position. Actuating means are provided for intermittently rotating the feed wheel and for moving the strip guide between its engaged and disengaged positions. The actuating means comprises a continuously rotating actuator shaft, the feed wheel being coupled to the actuator shaft by an intermittent rotary motion translating means such as a geneva mechanism, thereby to impart intermittent rotary motion to the feed wheel. The strip guide is coupled to the actuator shaft by linkage means for moving the strip guide between its engaged position and its disengaged position, the linkage means comprising a linkage actuator on the actuator shaft.

The invention further comprises a feeding means as described above in which the linkage means comprises a bell crank having a first arm, a second arm, and a pivotal axis, the first and second arms extending from the pivotal axis. The first arm is coupled to the actuator shaft and the second arm is coupled to the strip guide. The first arm is thus moved along a first arm coupling path by the actuator shaft and the second arm is coupled to the strip guide by a second arm coupling means, the second arm coupling means being movable along a rectilinear path which is on the strip guide. The pivotal axis is supported by an axis supporting means which is movable along an axis path in response to the movement of the first arm coupling means along the first arm coupling path and in response to the movement of the second arm coupling means along the rectilinear path. The first arm coupling means may comprise an eccentric coupling so that the first arm coupling path is a circular path and the second arm coupling means may comprise a crosshead type coupling.

In the preferred embodiment, the strip guide is against one surface of the strip material being fed and the sprocket wheel is against the opposite surface. The axis which supports the bell crank is on the same side of the strip material as the sprocket wheel.

The invention also comprises a bell crank mechanism of the type having an L-shaped bell crank lever. The lever has a first arm, a second arm, an actuator means, and an actuated means. The arms are joined to each other at a common end and each of the arms has a distal end. A first one of the ends is pivotally supported on an axis supporting means. The actuator means is connected to a second one of the ends, and the actuated means is connected to a third one of the ends. The bell crank mechanism is characterized in that the axis supporting means comprises a pivoted lever and a connecting link, the connecting link extending from the pivoted lever to the supporting means on the first end of the bell crank lever. The axis supporting means has a normal position and is movable along an axis supporting means primary path by virtue of the pivoted lever and the connecting link. The actuator means moves along an actuator path, the distance from the normal position of the axis supporting means to the actuator path being variable whereby the axis supporting means is required to move along the axis supporting means primary path during movement of the actuator means along the actuator path. The third end of the bell crank lever is moved along an actuated path, the distance between the normal position of the axis supporting means and the actuated path being variable and being determined by the actuator path. In accordance with one further embodiment, the first one of the ends, which is pivotally supported, is the common end of the arms of the bell crank lever.

THE DRAWING FIGURES

THE DISCLOSED EMBODIMENT

The embodiment of the invention described below is intended specifically for use with a metal stamping and forming machine of the type described in U.S. Pat. No. 4,497,196 which is hereby incorporated by reference in its entirety. Machines of the type shown in that U.S. patent have a plurality of spaced-apart die stations through which the strip material is fed in a vertical plane. A feeding means as described below may be provided adjacent to each die station or as required.

Figure 1:
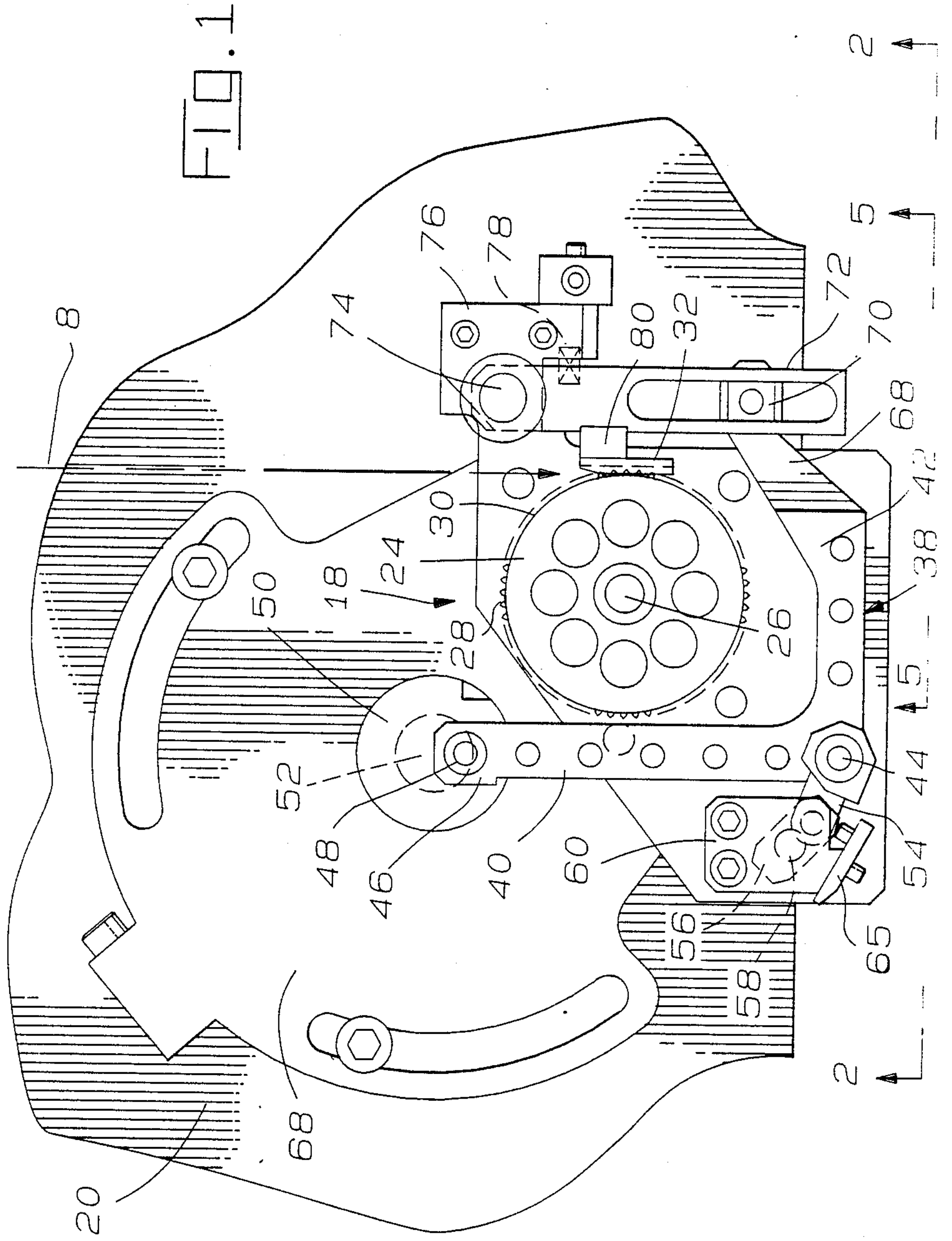
FIG. 1 is a top plan view of a feeding means in accordance with the invention.
Figure 7:
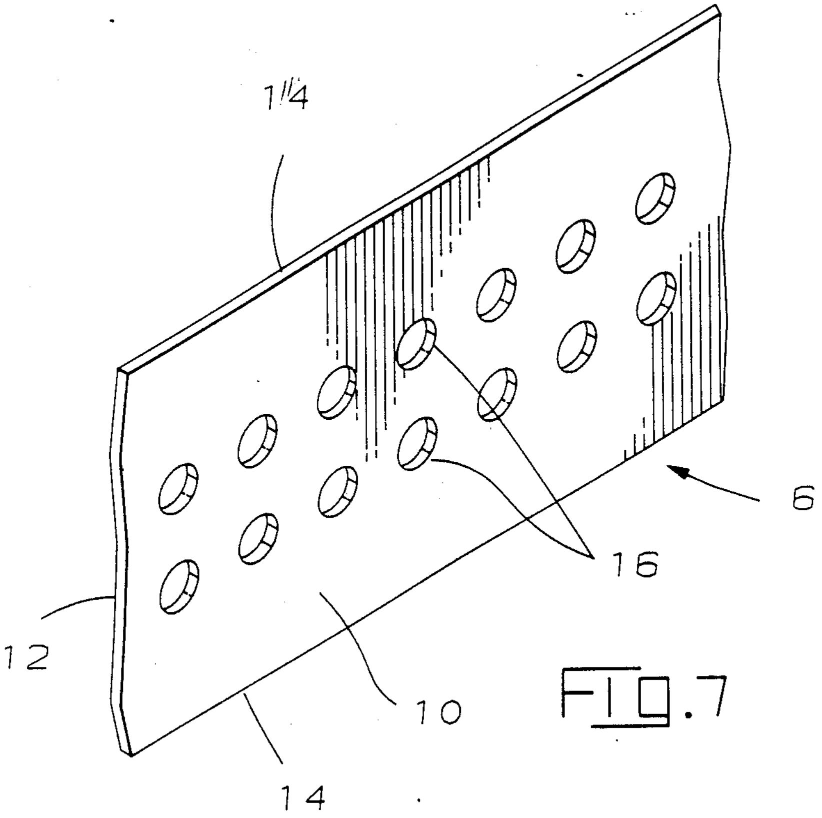
FIG. 7 is a perspective view of a short section of strip material.

The strip material 6, FIG. 7, is fed along a strip feed path 8 as shown in FIG. 1 and past the feed sprocket as described below. The strip material 6 has oppositely facing major surfaces 10, 12 and side edges 14. Two rows of spaced-apart index holes 16 are provided in the particular material shown, the rows being midway between the two side edges 14.

Figure 2:
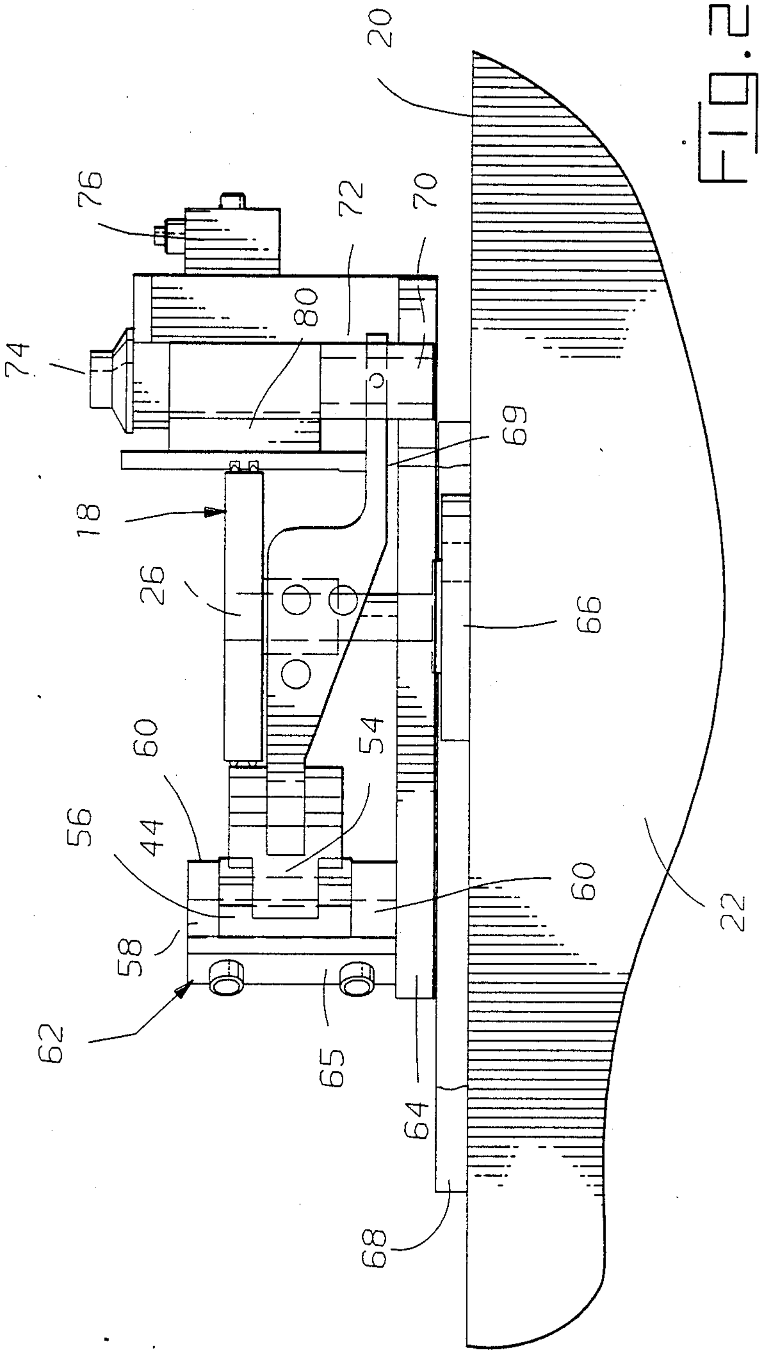
FIG. 2 is a side view looking in the direction of the arrows 2—2 of FIG. 1.

The strip feeding mechanism 18, FIGS. 1 and 2, is mounted on the upper surface 20 of a portion of the housing 22 of one of the modules of the machine shown in the above-identified U.S. Pat. No. 4,497,196. The feeding means comprises a feed sprocket 24 which is mounted on a sprocket shaft 26 and which has two rows of spaced-apart sprocket teeth 28 on its peripheral surface 30. The teeth are generally of the form of paraboloids so that when the strip is partially moved away from the surface 30 of the sprocket, the strip will be free to move by a very slight distance in its longitudinal direction.

The shaft 26 on which the sprocket 24 is mounted, is part of a commercially available Geneva mechanism which also has a shaft 52 that is parallel to, and spaced from the shaft 26. These two shafts extend from the upper surface of a housing 68 which in turn is mounted in the machine housing 22 as previously described. The shaft 52 is continuously rotated, preferably by gearing to the main power shaft of the stamping and forming machine or, if desired, by a motor. The shaft 26 is intermittently rotated by shaft 52 in the usual manner of a geneve motion. The Geneva mechanism is, of course, contained in the housing 68. The particular mechanism shown is of the type available from Cam Co., Division of Commercial Cam Division of Emerson Electric Company, Wheeling, Ill.

Figure 3:
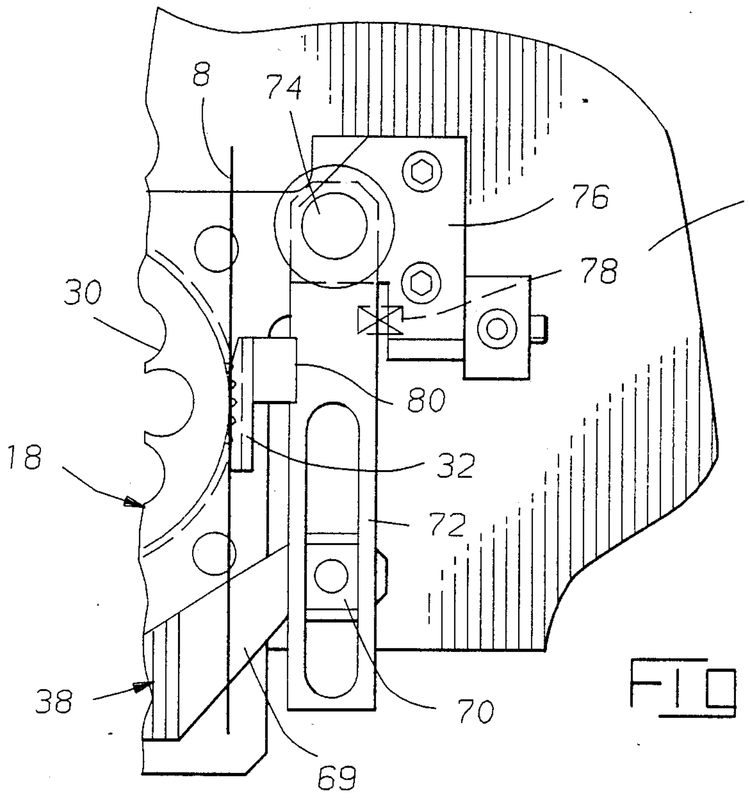
FIG. 3 is a top plan view, on an enlarged scale, showing a portion of the feed sprocket, the strip guide, and the manner in which the crosshead guide on which the strip guide is mounted is coupled to one arm of a bell crank, this view showing the positions of the parts when the strip is being fed.
Figure 4:
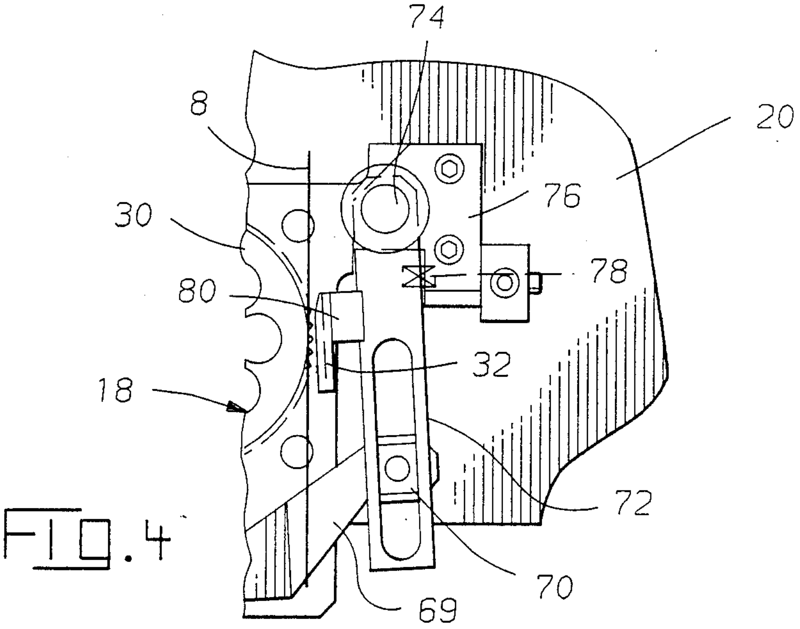
FIG. 4 is a view similar to FIG. 3 but illustrating the manner in which the strip guide is moved away from the feed sprocket.
Figure 5:
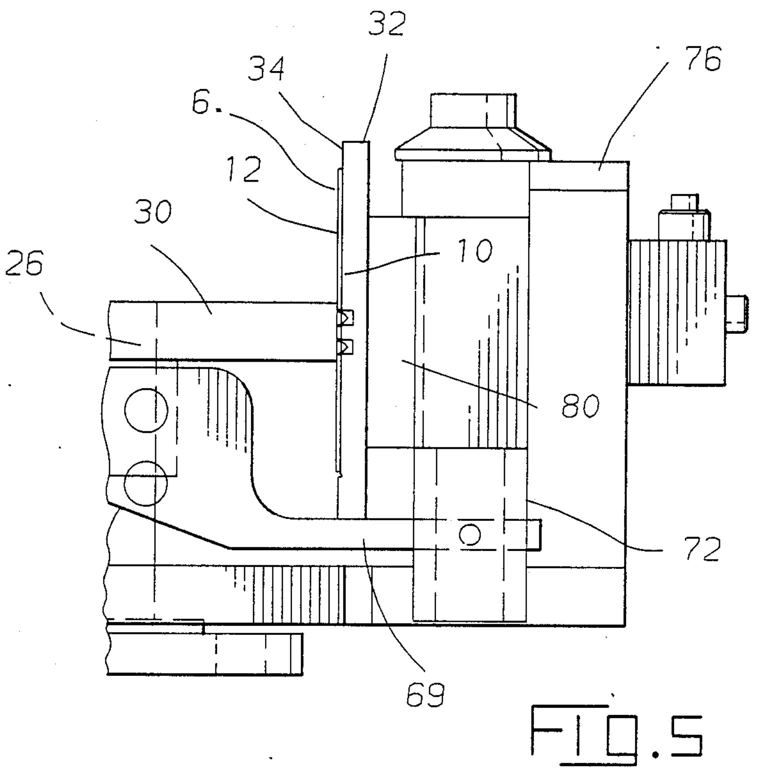
FIG. 5 is a view looking in the direction of the arrows 5—5 of FIG. 1.
Figure 6:
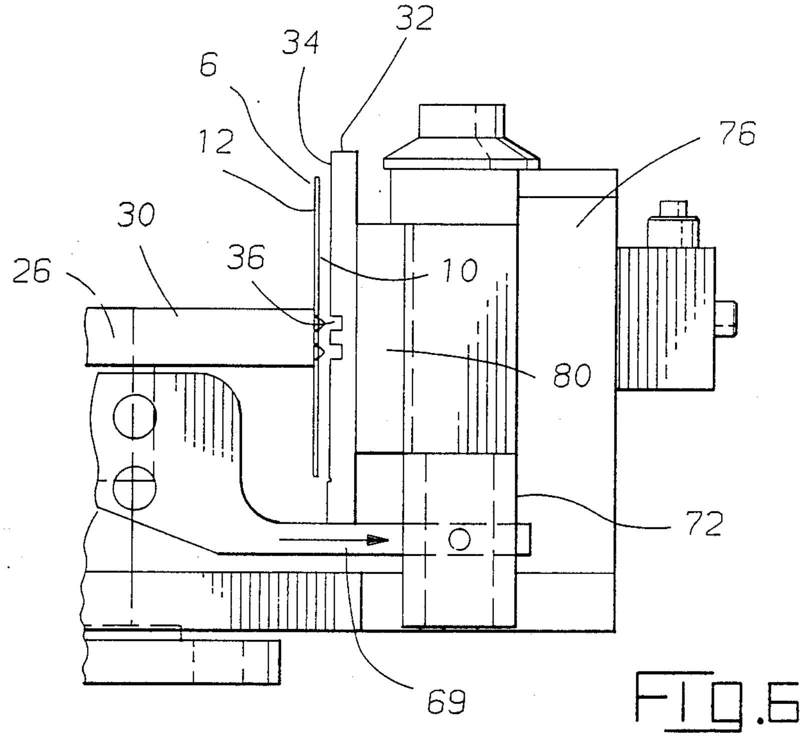
FIG. 6 is a view similar to FIG. 5 but showing the positions of the parts after the strip guide has been moved away from the sprocket wheel, that is during non-feeding intervals.

The strip feed path extends tangentially past the sprocket wheel and the strip is held against the sprocket wheel by a strip guide 32 which comprises a flat plate having a surface 34 (FIG. 5) which is opposed to the surface 10 of the strip. The surface 34 has spaced-apart grooves or channels 36 which receive the sprocket teeth when the strip material is being fed. During non-feeding intervals, this guide plate moves from the positions of FIGS. 3 and 5 to the positions of FIGS. 4 and 6, thereby to release the strip material from confinement. The movement of the guide plate 32 is controlled by a bell crank mechanism which will now be described.

The mechanism comprises a bell crank lever 38 having a first arm 40, a second arm 42, and a pivotal axis 44 at the common inner ends of the two arms. The outer or distal end 46 of the first arm 40 is coupled by means of a pivot pin 48 to a collar 50 on the end of the previously identified shaft 52. Since the shaft 52 rotates continuously, the pivot pin 48 follows a circular path with respect to the axis of the shaft 52 as indicated in FIG. 1.

The pivotal axis 44 is not fixed in space but is free to move along a pivotal axis path and is supported by a connecting link 54 which extends from the pivotal axis to one end of a lever 56 which is pivoted as shown at 58 at its opposite end. The lever 56 is pivotally supported between spaced-apart ears 60 of a bracket 62 which is supported on a base plate 64 which in turn is supported above an arm 66 of the Geneva mechanism mounted within a housing 68. During an operating cycle, the pivotal axis 44 moves in response to the circular motion of the end of the first arm 40 and the motion of the pivotal axis causes the link 54 and the lever 56 to move. The movement of this link and lever is, however, restricted or stopped during a portion of the operating cycle by a stop member 65 on the bracket 62 in order to cause the strip guide 32 to move abruptly away from the feed sprocket as will be described below. In the embodiment shown, the stop acts against the connecting link but the mechanism can be designed to have the stop act against the lever.

Figure 13:
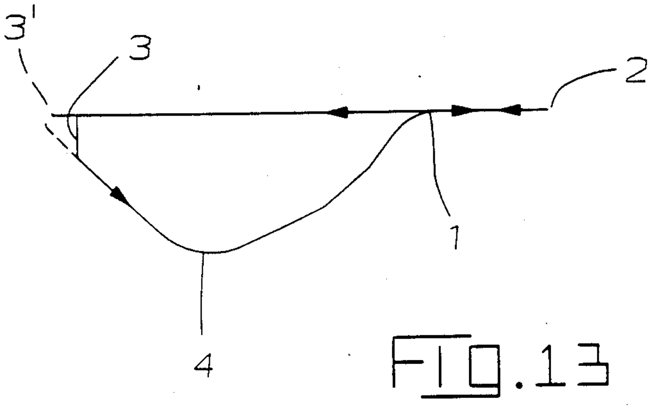
FIG. 13 is a diagram which illustrates the movement of the crosshead slide during an operating cycle.
Figure 10:
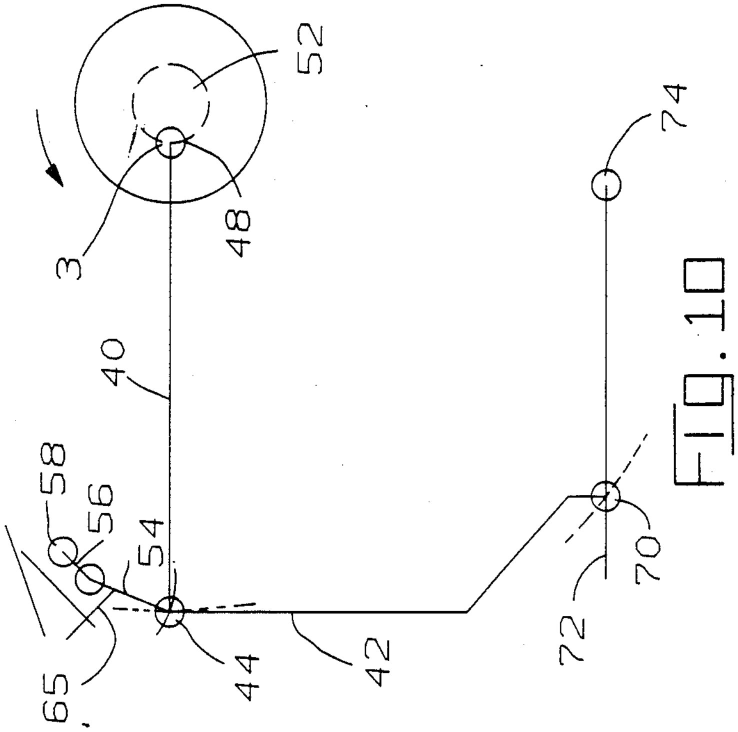
FIGS. 8–11 are diagrammatic views which illustrate the movements of the parts during a complete operating cycle of the feeding mechanism.
Figure 9:
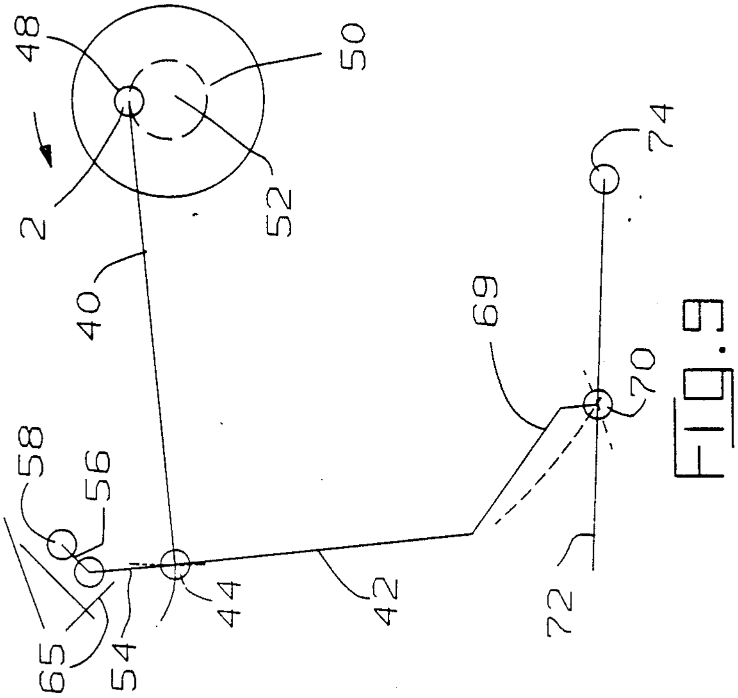
Figure 8:
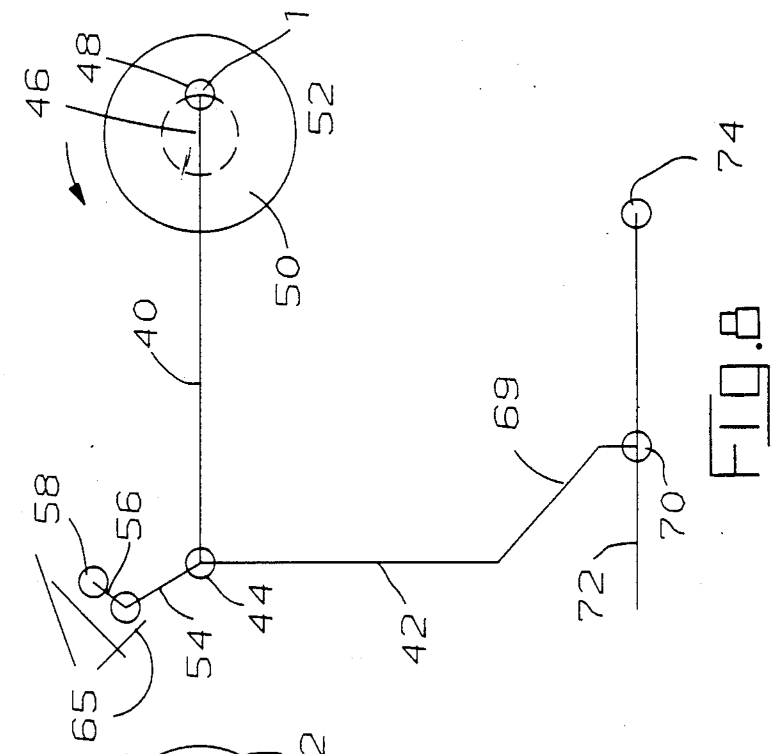
Figure 11:
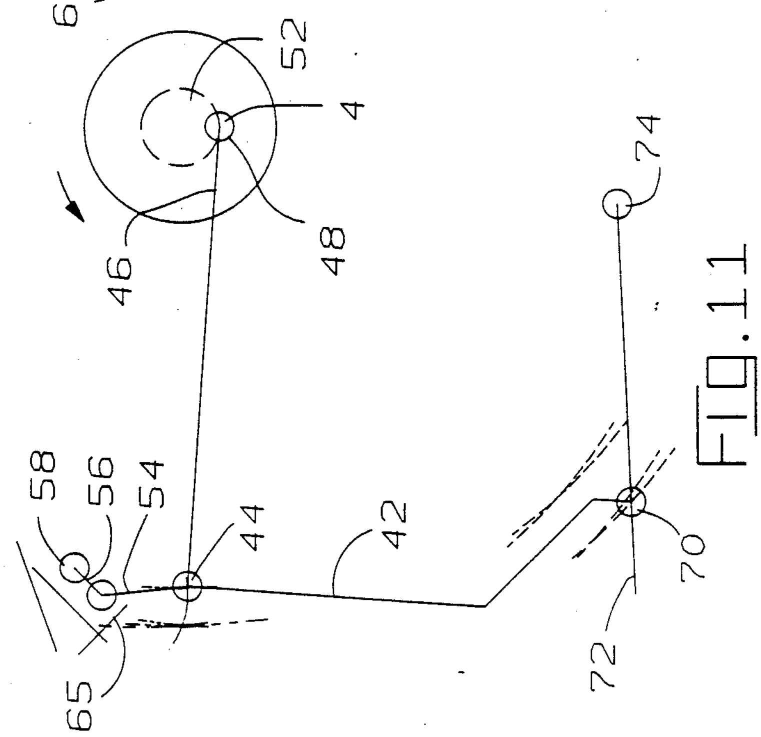

The end 69 of the second arm 42 has a crosshead slide 70 pivoted thereto and this crosshead slide is in turn reciprocably contained within a guide slot in a crosshead guide bar 72. The guide bar 72 in turn is pivotally mounted as shown at 74 on a bracket 76 which in turn is mounted on the plate 64. A spring is provided as shown at 78 to bias the crosshead guide in a clockwise direction as viewed in FIG. 1 so that the strip guide 32 which is secured as shown at 80 to the crosshead guide 72, will be held against the surface of the feed sprocket. The crosshead guide is swung in a counterclockwise direction from the position of FIG. 3 to the position of FIG. 4, thereby to disengage the strip guide from the strip material. The operation of the bell crank mechanism can be understood from an inspection of FIGS. 8–11 which show the positions of all of the parts of the mechanism as the pivot pin 48 rotates through 360 degrees from the position shown in FIG. 8. The positions of the pivot pin 48 are identified by the reference numerals 1, 2, 3, and 4, each position being angularly spaced by 90 degrees from the previous position and the next succeeding position. During a complete revolution of the pivot pin 48, the crosshead slide 70 moves along a path as shown in FIG. 13 and the positions on the crosshead slide which correspond to positions of the pivot pin 48 are indicated again by the reference numerals 1–4. At the beginning of the operating cycle, the crosshead slide is at position 1, FIG. 13, and moves a short distance rightwardly to position 2 (that is, during movement of pivot pin 48 from the position of FIG. 8 to the position of FIG. 9). While the coupling pin moves from the position of FIG. 9 to the position of FIG. 10, the crosshead slide tends to move from 2 to 3′ in FIG. 13. However, during this portion of the feeding cycle, the stop 65 prevents unrestrained movement of the link 56 and as a result, the crosshead slide is forced to move downwardly as shown at 3 in FIG. 13. Since the crosshead slide is forced to move, it carries with it the crosshead guide bar and the strip guide 32 is thereby moved out of engagement with the feed sprocket 24. As the coupling pin 48 then moves from the position of FIG. 10 through and past the position of FIG. 11 and finally back to the position of FIG. 8, the crosshead slide moves from 3 to 4 and then to 1 as shown in FIG. 13.

Figure 12:
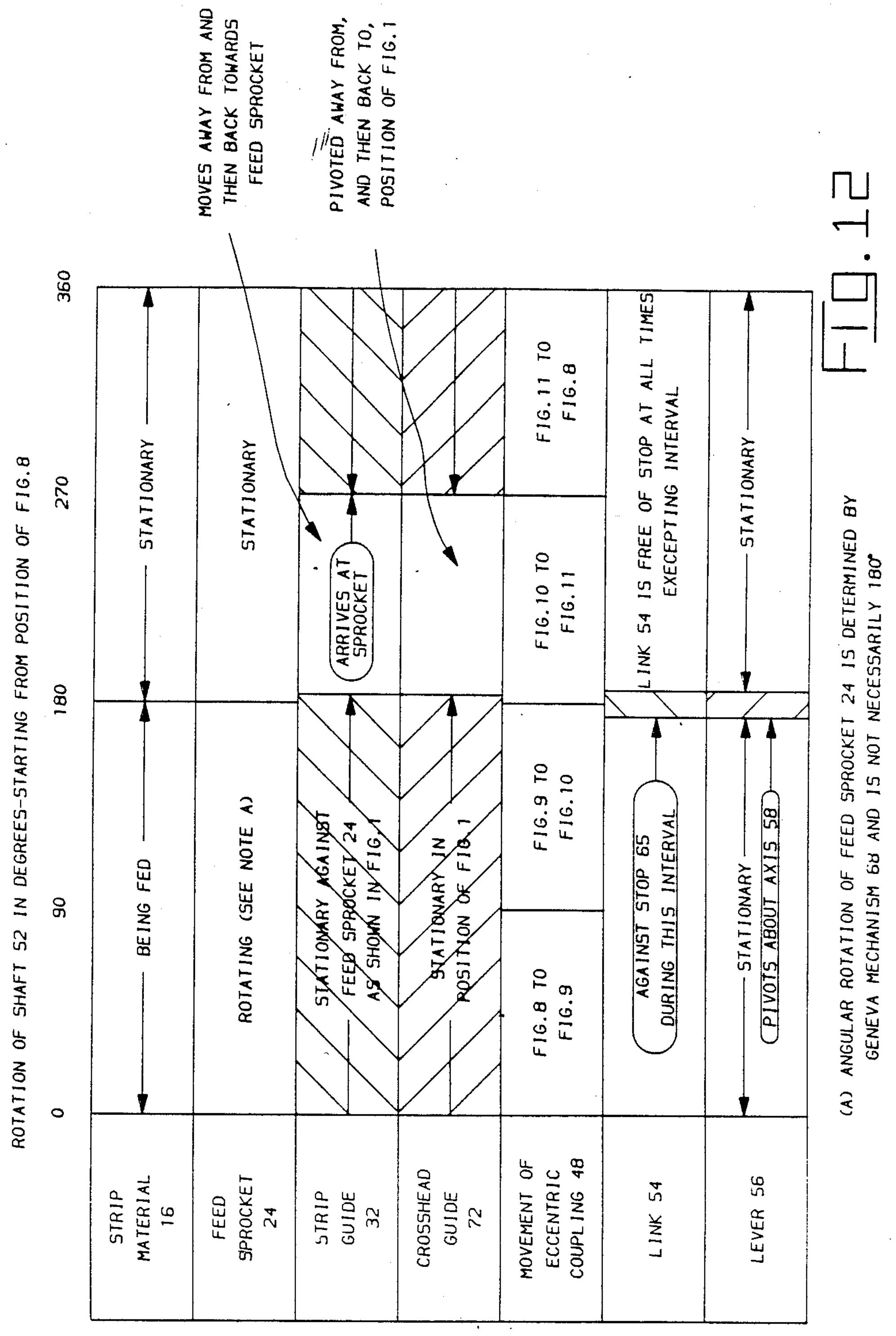
FIG. 12 is a timing diagram which explains the positions and movements of the parts.

The positions and functions of the various parts of the mechanism are described in FIG. 12 which shows the positions and describes the operations of the parts during a complete rotation of the shaft 52. It can be seen from this figure that a relatively long feeding interval is obtained, in excess of 180 degrees of rotation of the shaft 52. This feeding interval can be varied as desired by changing the relationships of the parts shown in FIG. 11.

A significant advantage of the invention is illustrated in FIG. 13 by the abrupt downward turn in the path of the crosshead slide as shown at 3. When the stop 65 limits the movement of the link 54 and the lever 56, the crosshead slide is forced to move abruptly away from the horizontal line extending from 2 to 3′ and the strip guide is thereby abruptly moved away from the strip. In the absence of the stop 65, the crosshead slide would follow the dotted line path indicated at 3′ at the end of its stroke leftwardly.

I claim:

1. A strip feeding means for intermittently feeding strip material along a strip feed path, the strip material having oppositely facing first and second major surfaces, the feeding means being of the type having an intermittently rotatable feed wheel, the feed wheel being engaged with the strip during feeding intervals and being disengaged from the strip during non-feeding intervals, the feeding means being characterized in that:

a strip guide assembly is provided for guiding the strip to the feed wheel, the strip guide assembly being movable between an engaged position and a disengaged position, the strip guide assembly being effective to hold the strip in engagement with the feed wheel when it is in its engaged position, the strip being unrestrained with respect to the feed wheel when the strip guide assembly is in its disengaged position, actuating means are provided for intermittently rotating the feed wheel and for moving the strip guide assembly between its engaged and disengaged positions, the actuating means comprising a continuously rotating actuator shaft, the feed wheel being coupled to the actuator shaft by intermittent rotary motion translating means thereby to impart intermittent rotary motion to the feed wheel, the strip guide assembly being coupled to the actuator shaft by linkage means for moving the strip guide assembly between its engaged position and its disengaged position, the linkage means comprising a linkage actuator on the actuator shaft.

2. A strip feeding means as set forth in claim 1 characterized in that the strip guide assembly extends tangentially past the feed wheel, the strip guide assembly having an upstream end and a downstream end relative to the direction of strip feed along the strip feed path, one of the ends being pivoted, the linkage means being coupled to the strip guide assembly at a location spaced from the one end whereby the strip guide assembly moves arcuately between its engaged position and its disengaged position.

3. A strip feeding means as set forth in claim 2 characterized in that the linkage means comprises a bell crank having a first arm, a second arm, and a pivotal axis, the first and second arms extending from the pivotal axis, the first arm being coupled to the actuator shaft, the second arm being coupled to the strip guide assembly.

4. A strip feeding means for intermittently feeding strip material along a strip feed path, the strip material having oppositely facing first and second major surfaces, the feeding means being of the type having an intermittently rotatable feed wheel, the feed wheel being engaged with the strip during feeding intervals and being disengaged from the strip during non-feeding intervals, a strip guide assembly being provided for guiding the strip past the feed wheel, the strip guide assembly having an upstream end and a downstream end, relative to the direction of strip feed along the strip feed path, the feeding means being characterized in that:

the strip guide assembly is movable between an engaged position and a disengaged position, the strip guide assembly being effective to hold the strip in engagement with the feed wheel when it is in its engaged position, the strip being unrestrained when the strip guide assembly is in its disengaged position, the strip guide assembly is pivotally mounted adjacent to one of its ends and is arcuately movable between its engaged and disengaged positions, actuating means are provided for intermittently rotating the feed wheel and for moving the strip guide assembly between its engaged and disengaged positions, the actuating means comprising a continuously rotating actuator shaft, the feed wheel being coupled to the actuator shaft by intermittent rotary motion translating means thereby to impart intermittent rotary motion to the feed wheel, the strip guide assembly being coupled to the actuator shaft by a bell crank means having a first arm, a second arm, and a pivotal axis, the first and second arms extending from the pivotal axis, the first arm is coupled to the actuator shaft by first arm coupling means, the first arm coupling means being continuously moved along a first arm coupling path by the actuator shaft, the second arm being coupled to the strip guide assembly by second arm coupling means, the second arm coupling means being movable to and from along a rectilinear path, the rectilinear path being on the strip guide assembly, the pivotal axis is supported by axis supporting means which is movable along an axis path in response to the movement of the first arm coupling along the first arm coupling path and the movement of the second arm coupling means along the rectilinear path, the intermittent rotary motion translating means and the bell crank means being synchronized to cause the strip guide assembly to be in its engaged position during each feeding interval and to be moved to its disengaged position at the end of each feeding interval by movement of the pivotal axis and the second arm laterally of the rectilinear path so that the strip guide assembly is moved by the second arm arcuately away from the strip feed path.

5. A strip feeding means as set forth in claim 4 characterized in that the first arm coupling means is an eccentric coupling and the first arm coupling path is a circular path.

6. A strip feeding means as set forth in claim 5 characterized in that the second arm coupling means is a crosshead type coupling.

7. A strip feeding means as set forth in claim 4 characterized in that the strip guide assembly is beside the first major surface of the strip material, the bell crank means being proximate to, and spaced from, the second major surface of the strip material, the second arm extending transversely across the strip feed path.

8. A strip feeding means as set forth in claim 7 characterized in that the axis supporting means comprises a pivoted lever and a connecting link, the pivotal axis being connected to the lever by the connecting link, the axis supporting means being movable along the axis path by virtue of the pivoted lever and the connecting link.

9. A strip feeding means as set forth in claim 8 characterized in that the stop means are provided for the pivoted lever and spring means are provided for biasing the strip guide assembly to its engaged position, the pivoted lever being movable against the stop means during movement of the axis supporting means along the axis path whereby, the axis supporting means and the second arm are moved laterally of the axis path and the strip guide assembly is thereby moved to its disengaged position.

10. A strip feeding means as set forth in claim 4 characterized in that the axis supporting means comprises a pivoted lever and a connecting link, the pivotal axis being connected to the lever by the connecting link, the axis supporting means being movable along the axis path by virtue of the pivoted lever and the connecting link.

11. A strip feeding means as set forth in claim 10 characterized in that stop means are provided for the pivoted lever and spring means are provided for biasing the strip guide assembly to its engaged position, the pivoted lever being movable against the stop means during movement of the axis supporting means along the axis path whereby, the axis supporting means and the second arm are moved laterally of the axis path and the strip guide assembly is thereby moved to its disengaged position.

12. A bell crank mechanism comprising an L-shaped bell crank lever having a first arm, a second arm, an actuator means, and an actuated means, the arms being joined to each other at a common end and each of the arms having a distal end, a first one of the ends being pivotally supported on an axis supporting means, the actuator means being connected to a second one of the ends, the actuated means being connected to the third one of the ends, the bell crank mechanism being characterized in that:

the axis supporting means comprises a pivoted lever and a connecting link, the connecting link extending from the pivoted lever to the supporting means on the first end, the axis supporting means having a normal position and being movable along an axis supporting means primary path by virtue of the pivoted lever and the connecting link, the actuator means moves along an actuator path, the distance from the normal position of the axis supporting means to the actuator path being variable whereby the axis supporting means is required to move along the axis supporting means primary path during movement of the actuator means along the actuator path, and the third end is moved along an actuated path, the distance between the normal position of the axis supporting means and the actuated path being variable and being determined by the actuator path.

13. A bell crank mechanism as set forth in claim 12 characterized in that the first one of the ends, which is pivotally supported, is the common end.

14. A bell crank mechanism as set forth in claim 13 characterized in that a third end stop is provided on the actuated path, the third end being movable against the third end stop, the axis supporting means being movable along an axis supporting means secondary path in response to movement of the third end against the third end stop.

15. A bell crank mechanism as set forth in claim 14 characterized in that the pivoted lever is pivoted intermediate its ends, the connecting link being connected to one end of the pivoted lever, the other end of the pivoted lever being resiliently biased against a lever stop, the pivoted lever being movable away from the lever stop when the third end moves against the third end stop.

16. A bell crank mechanism as set forth in claim 13 characterized in that the pivoted lever is pivoted at one end thereof, the connecting link being connected to the other end of the pivoted lever, a pivoted lever stop being provided for limiting the pivotal movement of the pivoted lever.

17. A bell crank mechanism as set forth in claim 16 characterized in that the actuated means comprises a crosshead having a slide and a guide assembly, the guide serving to guide the slide along a rectilinear path.

18. A bell crank mechanism as set forth in claim 17 characterized in that the guide is pivotally mounted at one end thereof whereby the guide is movable arcuately and laterally with respect to the rectilinear path, the guide being arcuately movable from a normal guide position when the pivoted lever moves against the pivoted lever stop.

19. A bell crank mechanism as set forth in claim 18 characterized in that resilient means are provided for biasing the guide to the normal guide position.

* * * * *

UNITED STATES PATENT OFFICE

CERTIFICATE OF CORRECTION

Patent No. 4,936,496 Dated June 26, 1990

Inventor(s) Johannes Cornelis Wilhelmus Bakermans

It is certified that error appears in the above-identified patent and that said Letters Patent is hereby corrected as shown below:

In claim 4, column 7, line 15, the word "from" should be --fro--.

In claim 8, column 7, line 46, "claim 7" should be --claim 4--.

In claim 10, column 7, line 63, "claim 4" should be --claim 7--.

Signed and Sealed this

Seventeenth Day of December, 1991

*Attest:*

HARRY F. MANBECK, JR.

*Attesting Officer*

*Commissioner of Patents and Trademarks*